(12) United States Patent
Haimovsky et al.

(10) Patent No.: US 7,386,711 B1
(45) Date of Patent: Jun. 10, 2008

(54) METHOD AND APPARATUS FOR REDIRECTING THE BOOT OPERATIONS OF ONE OR MORE SYSTEMS

(75) Inventors: Moti Haimovsky, Modi'in (IL); Yehezkel Levi, Bat-Yam (IL); Doron Oz, Even-Yehuda (IL)

(73) Assignee: Cisco Technology, Inc., San Jose, CA (US)

( * ) Notice: Subject to any disclaimer, the term of this patent is extended or adjusted under 35 U.S.C. 154(b) by 475 days.

(21) Appl. No.: 10/042,846

(22) Filed: Jan. 8, 2002

(51) Int. Cl.
*G06F 9/00* (2006.01)

(52) U.S. Cl. .............................. 713/2; 713/1; 713/100; 709/221; 709/222; 710/104

(58) Field of Classification Search ...................... 713/2, 713/1, 100; 709/221, 222; 710/104
See application file for complete search history.

(56) References Cited

U.S. PATENT DOCUMENTS

| | | | | |
|---|---|---|---|---|
| 4,128,875 | A | * | 12/1978 | Thurber et al. .............. 711/220 |
| 5,025,364 | A | * | 6/1991 | Zellmer ........................ 703/23 |
| 5,535,417 | A | * | 7/1996 | Baji et al. ...................... 710/22 |
| 5,539,890 | A | * | 7/1996 | Rahman et al. ............. 710/262 |
| 5,577,050 | A | * | 11/1996 | Bair et al. ................... 714/710 |
| 5,636,342 | A | * | 6/1997 | Jeffries ........................ 714/48 |
| 5,764,593 | A | * | 6/1998 | Turpin et al. ................. 713/2 |
| 5,842,011 | A | * | 11/1998 | Basu ............................. 713/2 |
| 5,867,713 | A | * | 2/1999 | Shrader et al. ............. 717/176 |
| 5,872,967 | A | * | 2/1999 | DeRoo et al. ................. 713/2 |
| 5,887,163 | A | | 3/1999 | Nguyen et al. |
| 5,948,101 | A | * | 9/1999 | David et al. .................... 713/2 |
| 5,956,350 | A | * | 9/1999 | Irrinki et al. ............... 714/718 |
| 5,991,817 | A | * | 11/1999 | Rowett et al. .............. 709/250 |
| 6,292,890 | B1 | | 9/2001 | Crisan |
| 6,345,294 | B1 | | 2/2002 | O'Toole et al. |
| 6,393,488 | B1 | * | 5/2002 | Araujo ........................ 709/245 |
| 6,401,183 | B1 | * | 6/2002 | Rafizadeh ................... 711/173 |
| 6,721,329 | B1 | * | 4/2004 | Van Driel ................... 370/401 |
| 6,757,759 | B1 | * | 6/2004 | Jones et al. ................. 710/100 |
| 2002/0087854 | A1 | * | 7/2002 | Haigh et al. ................... 713/1 |
| 2004/0015846 | A1 | * | 1/2004 | Haisraeli ..................... 717/115 |

OTHER PUBLICATIONS

"Getting Started Microsoft Windows 98", Microsoft Corporation, 1998-99, 2nd Edition.*
"High-Performance PowerPC System Controller for Communications Applications," Galileo Technology, Marvel Technology Group, Ltd., San Jose, CA, 2001, 6 pages.
"GT-64260 System Controller for PowerPC Processors," Galileo Technology, Marvel Technology Group, Ltd., San Jose, CA, Rev. 1.02, Aug. 11, 2000, pp. 1-256.

\* cited by examiner

*Primary Examiner*—Tse Chen
(74) *Attorney, Agent, or Firm*—The Law Office of Kirk D. Williams (57) ABSTRACT

The boot operations of one or more systems may be redirected. For example, a master boot processor may configure a slave boot processor to boot over a communication bus existing between the processors, which typically eliminates the need for boot software in slave systems. This can be accomplished such as by the master system updating a programmable interface of the slave system to identify an image from which to boot, such as from a remote boot image stored external to the slave system.

29 Claims, 3 Drawing Sheets

METHOD AND APPARATUS FOR REDIRECTING THE BOOT OPERATIONS OF ONE OR MORE SYSTEMS

FIELD OF THE INVENTION

This invention especially relates to system initialization procedures of communications and computer systems; and more particularly, the invention relates to redirecting the boot operations of one or more systems.

BACKGROUND OF THE INVENTION

Embedded systems are usually computer-based systems, and are designed and implemented for performing a pre-defined and specific activity. As such, their designs and complexities vary greatly, although they do share some common hardware and software structures. An embedded system, as well as a typical computer system, has several major hardware components connected together by buses. These components may include central processing units (CPUs), peripheral devices providing the interface between the system an the external world, buses (e.g., CPU bus, PCI bus, SDRAM bus, etc.) connecting various system components among themselves and sometimes between systems that reside close to each other, and system controllers implementing various bus interfaces in the system, providing interrupt and timer support, and providing address decoding and re-mapping.

The basic operations performed in a computer system are fetch (or read) from a specified location and store (or write) to a specified location. Each location is identified by a unique address assigned to it in the bus it is located in, hence creating an address map for that bus, and when combined with other subsystems, an address map is defined for the whole system. However, each bus may view the system differently. For example, devices may reside on different buses and have different address schemes and electrical characteristics. Yet, these diverse devices may need to communicate among themselves.

When a device on bus A (for example a PCI bus) wishes to access a device in bus B (for example a device bus), it places on its bus a request including the address of the device it wishes to access. It is the responsibility of the system controller to identify that request, identify the bus for which the request is intended (also called address decoding), and to perform the necessary electrical, address and data conversions for placing the request on the destination bus.

For example, a CPU, in order to access a device residing in the PCI bus, puts its request on the CPU bus. The system controller identifies that request, decodes the address, and determines that it is an address assigned to the PCI bus. The system controller further performs the necessary conversions and places the converted request on the PCI bus to be handled by the destination PCI device.

In terms of initializing such a system, after a processor has been reset, it has no knowledge of the system it is in, therefore it always accesses to a specific address (0xFFF00100 in power PC) and executes the command written there. It is the responsibility of the designer to place the boot code in that address. And, more precisely, to preset the system controller such that this address when placed on the CPU bus will be transferred to the bus where the boot code resides.

In a PC, this is the task of the BIOS as can be seen on the screen when booting the PC. System boot process includes among other things, programming the system controller for correct address space decoding, performing power-on self-test, initializing various components in the system, obtaining the system image, creating the sufficient environment for booting it, and then transfer control to the operating system.

One of the issues in a multi-processor embedded environment, such as in a communications or computer device, is the software boot sequence. This issue is especially noticed in master-slaves systems where one central processor is used to manage the system and to synchronize the software versions and software download processes of its slaves. In such systems, it is common to find a small and robust boot-loader software which is embedded into each processor module and is being executed by the local processor at boot time. The major task of such a boot-loader software is usually to perform the preliminary initializations (both software and hardware) required for creating a communication channel with the master, synchronize themselves with the master software, and then wait for further instructions from the master which usually starts loading the "real" software to the slaves, a cumbersome process by itself. Although a distributed boot-loader is implemented in many systems, it is far from being trivial, and requires careful planning of software upgrade process, error recovery, inter boot-loaders communication and more. Needed are new methods and apparatus for booting processors in multiprocessor and other systems.

SUMMARY OF THE INVENTION

Systems and methods are disclosed for redirecting the boot operations of one or more systems. One embodiment includes a master system coupled to a slave system. The slave system includes a programmable interface. A storage mechanism external to the slave system includes a remote boot image. The master system updates the programmable interface of the slave system to retrieve the remote boot image. The slave system boots from the remote boot image. In one embodiment, the programmable interface of the slave controller includes a system controller, which is programmed by the master system to redirect a boot image retrieval request to the storage mechanism including the remote boot image. In one embodiment, a corresponding update is made to the system controller of the master system. In one embodiment, multiple boot requests of multiple slave systems are redirected to the same or different boot images.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for redirecting the boot operations of one or more systems. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "system" is used generically herein to describe any number of components, elements, subsystems, processors, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to the block and flow diagrams, are typically performed in a different serial or parallel ordering and/or by different components and/or over different connections in various embodiments in keeping within the scope and spirit of the invention. Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "storage mechanism" includes any type of memory, storage device or other mechanism for maintaining instructions or data in any format. The term "data structure" is an extensible term referring to any data structure, data base, and/or one or more or an organizational schemes that can be applied to data to facilitate interpreting the data or performing operations on it, such as, but not limited to memory locations or devices, sets, trees, heaps, lists, linked lists, arrays, tables, pointers, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrase "based on x" is used to indicate a minimum set of items x from which something is derived, wherein "x" is extensible and does not necessarily describe a complete list of items on which the operation is based. Additionally, the phrase "coupled to" is used to indicate some level of direct or indirect connection between two elements or devices, with the coupling device or devices modify or not modifying the coupled signal or communicated information. The term "subset" is used to indicate a group of all, less than all, or none of the elements of a set. Moreover, the term "or" is used herein to identify an alternative selection of one or more, including all, of the conjunctive items.

Methods and apparatus are disclosed for redirecting the boot operations of one or more systems. In one embodiment, a master boot processor configures one or more slave boot processors to boot over a communication bus existing between the processors, which typically eliminates the need for boot software in the slave systems.

One embodiment includes a master system coupled to a slave system. The slave system includes a programmable interface. A storage mechanism external to the slave system includes a remote boot image. The master system updates the programmable interface of the slave system to retrieve the remote boot image. The slave system boots from the remote boot image. In one embodiment, the programmable interface of the slave controller includes a system controller, which is programmed by the master system to redirect a boot image retrieval request to the storage mechanism including the remote boot image. In one embodiment, a corresponding update is made to the system controller of the master system. In one embodiment, multiple boot requests of multiple slave systems are redirected to the same or different boot images.

In one embodiment, one or more configurable components are included in the master and/or slave systems, such that, these can be configured by the master without software assistance from the slave. These components are capable of transforming and redirecting one bus protocol and addresses to another one. In this way, every slave-CPU access, starting from the first command it performs, is automatically being translated and transformed to and through the communication bus to the slave software residing in the master system (e.g., in memory or other storage device) allowing the slave to directly boot from software located there. Because this is a configurable component, it also very flexible in address translation between buses. Each slave can be directed to boot from a same or different location. One embodiment provides the master a simple way for controlling the software being loaded by each slave by redirecting the boot operations of one or more systems. In one embodiment, these slave programmable interfaces are statically preprogrammed. In one embodiment, these slave programmable interfaces are dynamically programmed by a master or other system or device.

In one embodiment, slave systems use the same boot software, thus, it can be upgraded by replacing a single image of the software in a memory or storage device of the slave boot source. In one embodiment, the slave boot source resides within the master system. In one embodiment, the slave boot source resides in another of the slave systems, or in another location or system (e.g., memory or storage device in another system or on a bus.) Thus, the booting of one or more slaves (and possibly the master) is redirected to the other system wherein the boot software resides. In one embodiment, at least one of the slave systems is redirected to boot from a first location different than a second location where another of the slave systems is redirected from which to boot. In one embodiment the first and second locations are different addresses within a same memory or storage device. In one embodiment, one or more slave systems are booted sequentially. In one embodiment, one or more slave systems are booted from the same boot source approximately simultaneously. In one embodiment, the number or size of non-volatile memory required by a slave system is reduced as it is no longer required for booting.

In one embodiment, a device includes six stand-alone embedded systems, with one of the controllers acting as the master and the other as slaves. The boot software for all slaves resides in memory or a storage device included in the master system, and the slaves are configured to boot from it while thinking that they are booting from a local boot device. In one embodiment, all the slave devices are connected to the master via a PCI bus using a programmable Galileo GT64240 system controller. Using the GT64260 mapping registers, the master programs the slaves to direct the CPU 0xFF000000 address and above to the PCI, and programs its controller to direct those addresses to the bus where the boot code (also herein referred to as the boot image) resides, hence creating a tunnel between each of the slaves CPUs and the device where the boot code resides. Releasing a slave CPU after this configuration has been performed, the slave CPU will boot as directed with the boot code residing in the master, other device or location. Using such a configurable component, allows the boot process to be very flexible in address translation between buses. Dynamically, a slave can be directed to boot from a different location, which provides the master a simple way for controlling the software being loaded by each slave.

Figure 1:
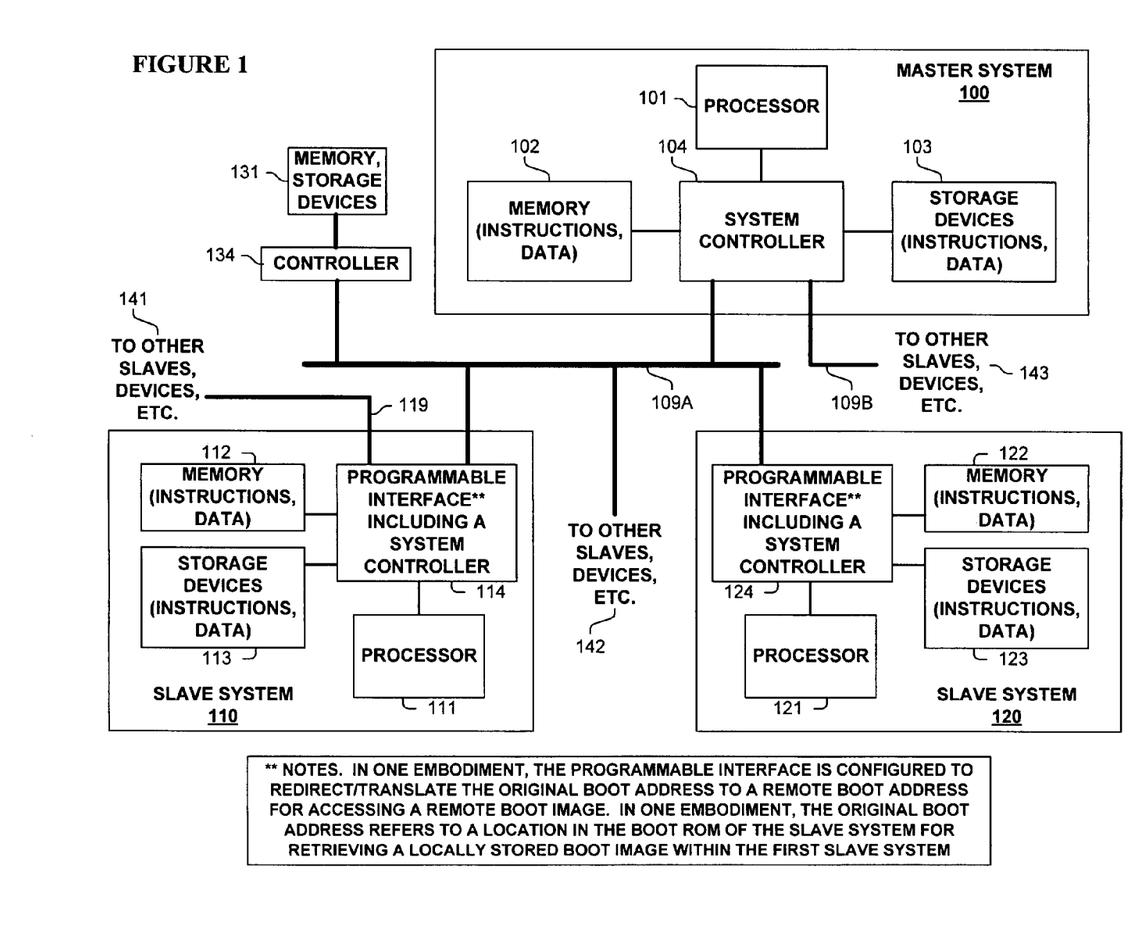
FIG. 1 is a block diagram of an embodiment redirecting the boot operations of one or more systems.

FIG. 1 illustrates one embodiment of an apparatus with a master system 100 redirecting the boot operations of one or more slave systems 110 and 120, and/or other slaves or other devices 141, 142, and 143. Systems 100, 110 and 120 may be part of a router or other communications or computer system, or any other device. In one embodiment, these systems and devices are interconnected via one or more communications mechanisms 109A, 109B and 119 (shown as buses for illustrative purposes) and systems controllers (e.g., system controllers 104, 114 and/or 124). Although two slave systems 110 and 120 are illustrated in detail, it is to be understood that one embodiment includes only one slave system, while one embodiment includes more than two slave systems.

In one embodiment, master system 100 includes a processor 101, memory 102, storage devices 103, and a system controller 104. Various embodiments of system 100 may include more or less elements. For example, one embodiment does not include storage devices 103. The operation of system 100 is typically controlled by processor 101 using memory 102 and storage devices 103 to perform one or more tasks or processes. Memory 102 is one type of computer-readable medium, and typically comprises random access memory (RAM), read only memory (ROM), flash memory, integrated circuits, and/or other memory components. Memory 102 typically stores computer-executable instructions to be executed by processor 101 and/or data which is manipulated by processor 101 for implementing functionality in accordance with embodiments of the invention. In one embodiment, memory 102 store one or more remote boot images which will may be used for booting slave system 110 and/or 120. Storage devices 103 are another type of computer-readable medium, and typically comprise solid state storage media, disk drives, diskettes, networked services, tape drives, and other storage devices. Storage devices 103 typically store computer-executable instructions to be executed by processor 101 and/or data which is manipulated by processor 101 for implementing functionality in accordance with embodiments of the invention. In one embodiment, storage devices 103 store one or more remote boot images which will may be used for booting slave system 110 and/or 120.

As used herein and contemplated by the invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

FIG. 1 further illustrates one embodiment of slave system 110. In one embodiment, slave system 110 includes a processor 111, memory 112, storage devices 113, and a system controller 114. Various embodiments of slave system 110 may include more or less elements. For example, one embodiment does not include storage devices 113. The operation of system 111 is typically controlled by processor 111 using memory 112 and storage devices 113 to perform one or more tasks or processes. In one embodiment, memory 112 and/or storage devices 113 store one or more remote boot images which will may be used for booting slave system 120.

FIG. 1 further illustrates one embodiment of slave system 120. In one embodiment, slave system 120 includes a processor 121, memory 122, storage devices 123, and a system controller 124. Various embodiments of slave system 120 may include more or less elements. For example, one embodiment does not include storage devices 123. The operation of system 121 is typically controlled by processor 121 using memory 122 and storage devices 123 to perform one or more tasks or processes. In one embodiment, memory 122 and/or storage devices 123 store one or more remote boot images which will may be used for booting slave system 110.

In one embodiment, master system 100 is first booted, with slave processors 111 and 121 remaining in a reset condition until released by master processor 101. After master system 110 has completed its boot process (or at least got into a well defined state), it initiates the booting of one or more of the slave systems 110 and 120 (and any other slaves, devices, etc. in the same manner) after manipulating slave systems 110 and 120 to basically believe that their boot code is located locally in their respective system, while it actually resides in another location, such as in master (volatile or non-volatile) memory 102 or storage devices 103, memory or storage devices 131 (accessed via controller 134), or memory 112, 122 or storage devices 113, 123 of another of the slave systems 110, 120, or other locations.

Figure 2:
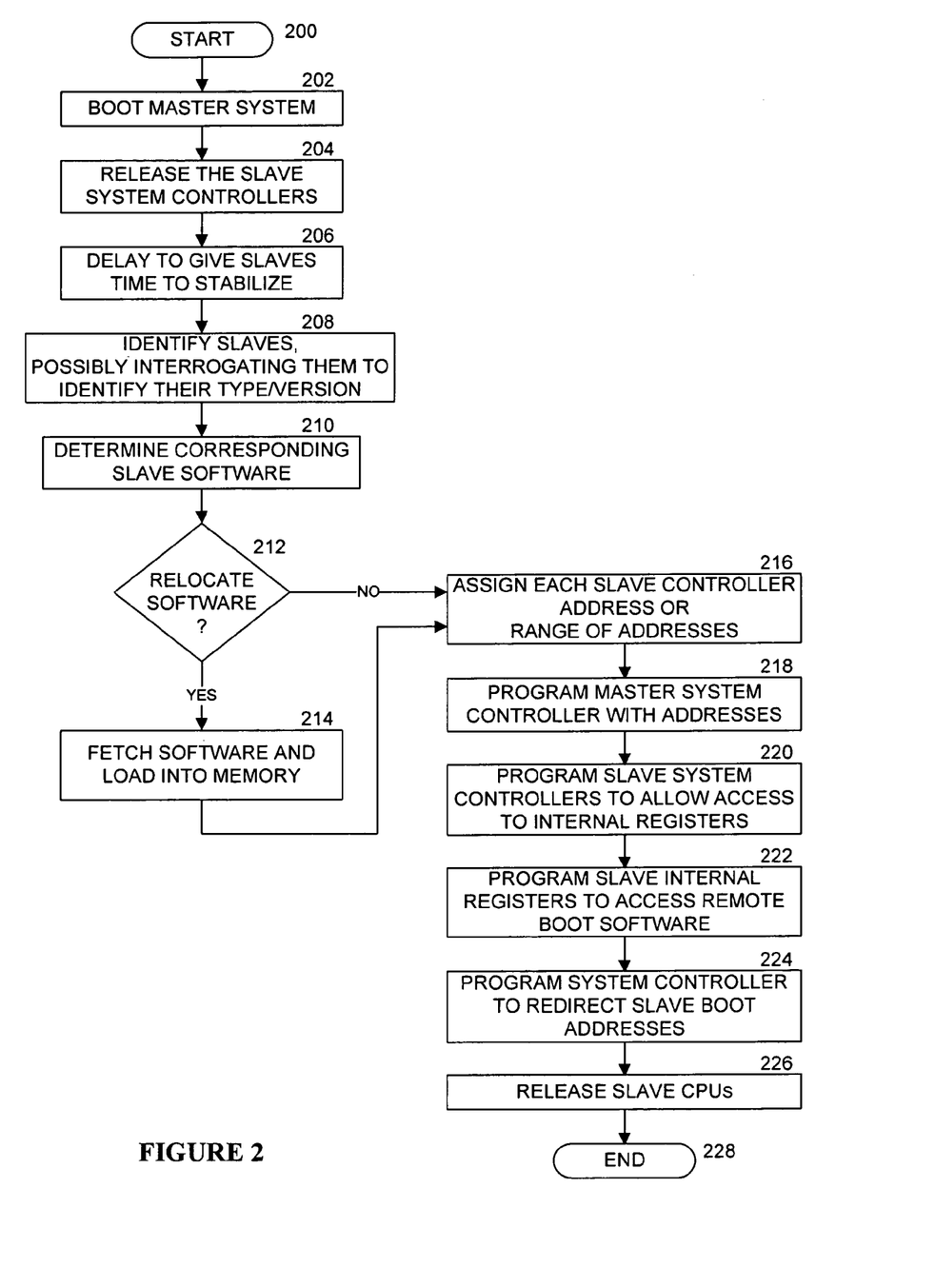
FIG. 2 is a flow diagram of a process used in one embodiment for redirecting the boot operations of one or more systems.

FIG. 2 presents a flow diagram of a boot process used in one embodiment for redirecting the boot operations of one or more systems. At power-up or upon reset or other initialization condition, processing begins with process block 200, and proceeds to process block 202, wherein the master system is booted. In process block 204, the slave controllers are released, and as indicated in process block 206, a possible delay is imposed to ensure their initialization has stabilized.

Next, in process block 208, the slave systems whose boot operation is to be redirected are identified. In one embodiment, the shared bus or buses (e.g., PCI buses) are scanned or predefined addresses are used in order to locate the slave devices. In one embodiment, the PCI bus is scanned looking for the system controllers of the slaves. For each slave found, the master interrogates the slave for its type and version, while in one embodiment, this information is predetermined and available to the master system such as via a data structure located in memory. In process block 210, the master system determines the boot software and its location appropriate for the slaves and the particular application to be performed by each slave. This software can reside in a local or remote memory, storage device, server, or other location.

In one embodiment, as indicated by process blocks 212 and 214, if the corresponding one or more boot software sets are not located in memory, the corresponding one or more boot software sets are retrieved and stored in memory for easy and quick access during the booting of the slave systems.

Next, in process block 216, the master system assigns each slave controller with an address or a range of addresses to be used by the master processor for accessing the slave systems. In process block 218, the master programs its own system controller with these addresses. From this point on, when the master processor issues an address destined to a certain slave, the master system controller will translate it to an appropriate bus address and redirect it to the bus where the desired slave controller is located.

In process block 220, the master processor programs each of the slave system controllers to allow access to their internal registers from the shared bus to allow the master processor to configure the slave system controllers. In one embodiment, the master processor, using PCI configuration cycles, accesses the PCI registers of the slave system controllers and assigns each slave system controller with the base address and an access rule. From this point on, the master processor can access the registers of the slave system controllers by issuing standard read/write commands from/to those addresses.

In process block 222, the master processor manipulates the registers of the slave system controllers so that when a slave processor issues an address that is part of the boot-code range of addresses, this address will be directed the shared bus. In one embodiment, the system controllers are also programmed to translate the address to a different one when one or more slaves are to access one or more different locations in the master system. In this manner, the addresses generated by the slave CPU, which were originally directed to its boot ROM, are now redirected to the shared bus and to the desired remotely located boot code.

In process block 224, the master programs its system controller to direct the slave boot addresses (generated by a slave CPU and directed by a corresponding slave system controller to the shared bus) to the corresponding boot code location, which may reside in memory or storage device of the master system, another slave system, remote server, or other system or device.

In process block 226, the processors of the slave systems are released, so they will start their boot process, and retrieve its boot code from the redirected location. This will eventually boot the slaves. Processing is complete as indicated by process block 228.

Figure 3:
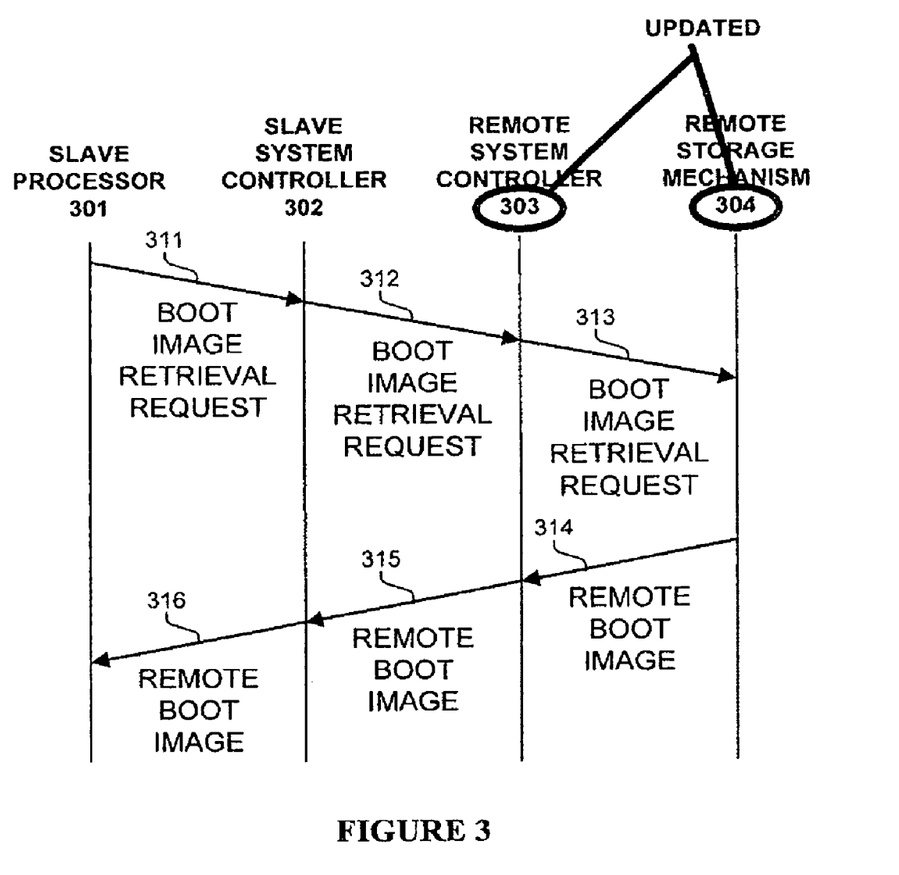
FIG. 3 is a message sequence chart illustrating the flow of a redirected boot request and corresponding remote boot image in one embodiment.

FIG. 3 illustrates a message sequence chart illustrating the flow of a redirected boot request and corresponding remote boot image in one embodiment. Message sequence charts are well-known and often used to illustrate communication of any type and format of information (e.g., messages, data, instructions, files, etc.) between components or systems. In one embodiment, slave system controller 302 and remote system controller 303 are programmed to redirect a boot image retrieval request for the slave system to remote storage mechanism 304, which contains the remote boot image.

In one embodiment, slave processor 301 initiates a boot image retrieval request 311, which is identified by slave system controller 302, which then relays boot image retrieval request 312 to remote system controller 303, which then relays boot image retrieval request 313 to remote storage mechanism 304. Remote storage mechanism 304 retrieves the remote boot image in response, and sends the remote boot image 314 to remote system controller 303, which then relays remote boot image 315 to slave system controller 302, which then delivers remote boot image 316 to slave processor 301 (or a memory associated therewith). Slave processor 301 then boots using remote boot image 316.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus comprising:
   a master system including: a master memory, a storage mechanism for storing a first remote boot image and a second remote boot image, and a master system controller;
   a first slave system including: a first memory, a first processor, and a first programmable interface coupled to the master system, the first programmable interface including a first system controller;
   a second slave system including: a second memory, a second processor, and a second programmable interface coupled to the master system, the second programmable interface including a second system controller; and
   a bus communicatively coupling the master system, the first slave system, and the second slave system;
   wherein the master system is configured to interrogate the first or the second slave systems to identify their respective one or more characteristics after the master system is booted and the respective first or second system controller is released by said booted master system;
   wherein the master system is configured to determine that the first remote boot image should be used for the first slave system in response to said interrogation of the first slave system and based on said identified one or more characteristics of the first slave system, to update the first programmable interface to cause the first slave system to retrieve the first remote boot image and to boot from said retrieved first remote boot image, and to release the first processor for booting from the first remote boot image after said updating the first programmable interface; and
   wherein the master system is configured to determine that the second remote boot image should be used for the second slave system in response to said interrogation of the second slave system and based on said identified one or more characteristics of the second slave system, to update the second programmable interface to cause the second slave system to retrieve the second remote boot image and to boot from said retrieved second remote boot image, and to release the second processor for booting from the second remote boot image after said updating the second programmable interface;

wherein said updating the first programmable interface and the second programmable interface includes: the master system assigning each of the first and the second system controllers an address or range of addresses to be used by the master system for accessing registers of the first and the second system controllers; and the master system manipulating said registers of the first and second system controllers and programming the master system controller such that a boot address that is part of a boot-code range of addresses is redirected for accessing the first remote boot image by the first slave system and the second remote boot image by the second slave system.

2. The apparatus of claim 1, wherein said one or more characteristics include its type.

3. The apparatus of claim 2, wherein said one or more characteristics include its version.

4. The apparatus of claim 1, wherein said one or more characteristics include its version.

5. The apparatus of claim 1, wherein the master system is configured to scan the bus looking for system controllers of slave systems in order to discover the first system controller and the second system controller prior to said interrogating the first and the second slave systems.

6. The apparatus of claim 5, wherein the bus is a PCI bus.

7. The apparatus of claim 1, wherein the bus is a PCI bus.

8. A method performed in an apparatus including a master system communicatively coupled to a slave system, the master system including a master processor, a master memory associated with the master processor, a master system controller, and a storage mechanism configured to store information, the information including a plurality of remote boot images; the slave system including a slave processor, a slave controller and a memory associated with the slave processor; the method comprising:
   the master system, after the master system is booted and the slave controller is released, performing one or more operations to interrogate the slave system to identify one or more characteristics of the slave system, and to determine a boot image of the plurality of remote boot images based on said one or more characteristics identified during said one or more interrogation operations;
   the master system assigning the slave controller an address or range of addresses to be used by the master system for accessing one or more registers of the slave controller;
   the master system manipulating said one or more registers of the slave controller, programming the master system controller such that a boot address that is part of a boot-code range of addresses is redirected for accessing said determined boot image by the slave system, and releasing the slave processor for booting from said determined boot image after manipulating said one or more registers of the slave controller;
   the slave controller sending a boot request to the master system controller;
   the master system controller, in response to the boot request, causing said determined boot image to be retrieved from the storage mechanism and communicated to the slave controller;
   the slave controller relaying said determined boot image to the slave processor or the memory associated with the slave processor; and
   the slave processor booting with said determined boot image.

9. The method of claim 8, wherein said one or more characteristics include its type or version.

10. The method of claim 8, wherein said operation of the slave controller sending the boot request to the master controller includes the slave controller translating an original boot address to a remote boot address for accessing the boot image determined based on said one or more characteristics identified during said one or more interrogation operations.

11. The method of claim 10, wherein the slave system includes a boot ROM; and wherein the original boot address refers to a location in the boot ROM.

12. The method of claim 8, wherein said one or more characteristics include its type.

13. The method of claim 12, wherein said one or more characteristics include its version.

14. The method of claim 8, wherein said one or more characteristics include its version.

15. The method of claim 8, wherein the master system is said communicatively coupled to the slave system via a PCI bus.

16. An apparatus comprising:
   a master system; and
   a slave system including: a memory, a processor, and a programmable interface coupled to the master system, the programmable interface including a slave system controller;
   wherein the master system includes: a master memory, a storage mechanism for storing a plurality of remote boot images, the plurality of remote boot images including a remote boot image; a master system controller; means for performing, after the master system is booted and the slave system controller is released, one or more operations to identify one or more characteristics of the slave system, said one or more operations including interrogating the slave system to identify its respective said one or more characteristics; means for determining that the remote boot image of the plurality of remote boot images should be used for the slave system in response to said interrogation of the slave system and based on said identified one or more characteristics of the slave system; and means for updating the programmable interface of the slave system before the processor of the slave system is released, to cause the slave system to retrieve and boot from the remote boot image, including means for assigning, by the master system, the slave system controller an address or range of addresses to be used by the master system for accessing one or more registers of the slave system controller, and means for manipulating, by the master system, said one or more registers of the slave system controller and programming the master system controller such that a boot address that is part of a boot-code range of addresses is redirected for accessing the remote boot image by the slave system.

17. The apparatus of claim 16, wherein the slave system includes a boot ROM; and wherein an original boot address refers to a location in the boot ROM for retrieving a locally stored boot image within the slave system.

18. The apparatus of claim 16, wherein said one or more characteristics include its type.

19. The apparatus of claim 18, wherein said one or more characteristics include its version.

20. The apparatus of claim 16, wherein said one or more characteristics include its version.

21. The apparatus of claim 16, wherein the master system is communicatively coupled to the slave system via a bus.

22. The apparatus of claim 21, wherein the bus is a PCI bus.

23. An apparatus comprising:
a master system including: a master memory and a storage mechanism for storing a first remote boot image; and a master system controller;
a first slave system including: a first memory, a first processor, and a first programmable interface coupled to the master system, the first programmable interface including a first system controller; and
wherein the master system is configured to interrogate, after the master system is booted and the first system controller is released, the first slave system to identify one or more characteristics of the first slave system; wherein the master system is configured to determine that the first remote boot image should be used for the first slave system in response to said interrogation of the first slave system and based on said identified one or more characteristics of the first slave system, to update the first programmable interface to cause the first slave system to retrieve the first remote boot image, and to release the first processor for booting from the first remote boot image after updating the first programmable interface;
wherein said operation of updating the first programmable interface includes: the master system assigning the first system controller an address or range of addresses to be used by the master system for accessing one or more registers of the first system controller; and the master system manipulating said one or more registers of the first system controller and programming the master system controller such that a boot address that is part of a boot-code range of addresses is redirected for accessing the first remote boot image by the first slave system.

24. The apparatus of claim 23, wherein said one or more characteristics include its type.

25. The apparatus of claim 24, wherein said one or more characteristics include its version.

26. The apparatus of claim 23, wherein said one or more characteristics include its version.

27. The apparatus of claim 24, wherein the first slave system includes a boot ROM; and wherein an original boot address refers to a location in the boot ROM for retrieving a locally stored boot image within the first slave system.

28. The apparatus of claim 23, wherein the master system is communicatively coupled to the slave system via a bus.

29. The apparatus of claim 28, wherein the bus is a PCI bus.

\* \* \* \* \*

UNITED STATES PATENT AND TRADEMARK OFFICE
CERTIFICATE OF CORRECTION

| | | |
|---|---|---|
| PATENT NO. | : 7,386,711 B1 | Page 1 of 1 |
| APPLICATION NO. | : 10/042846 | |
| DATED | : June 10, 2008 | |
| INVENTOR(S) | : Haimovsky et al. | |

It is certified that error appears in the above-identified patent and that said Letters Patent is hereby corrected as shown below:

Col 12, line 15, Claim 27, replace "apparatus of claim 24" with -- apparatus of claim 23 --

Signed and Sealed this

Sixteenth Day of February, 2010

David J. Kappos
*Director of the United States Patent and Trademark Office*